US012573272B2

(12) United States Patent
Patel et al.

(10) Patent No.: US 12,573,272 B2
(45) Date of Patent: Mar. 10, 2026

(54) SYSTEMS AND METHODS FOR ATM SESSION CACHING

(71) Applicant: JPMORGAN CHASE BANK, N.A., New York, NY (US)

(72) Inventors: Ankitkumar Patel, Dublin, OH (US); Anatoliy Lelikov, Columbus, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/597,427

(22) Filed: Mar. 6, 2024

(65) Prior Publication Data

US 2025/0078631 A1      Mar. 6, 2025

Related U.S. Application Data

(60) Provisional application No. 63/489,276, filed on Mar. 9, 2023.

(51) Int. Cl.
*G07F 19/00* (2006.01)
*H04L 67/02* (2022.01)

(52) U.S. Cl.
CPC ............ *G07F 19/211* (2013.01); *H04L 67/02* (2013.01)

(58) Field of Classification Search
CPC ....... G07F 19/211; H04L 67/02; H04L 67/568
See application file for complete search history.

(56) References Cited

U.S. PATENT DOCUMENTS

2011/0179305 A1* 7/2011 Lammel .............. G06F 11/2033
714/E11.071

* cited by examiner

*Primary Examiner* — Matthew Mikels
(74) *Attorney, Agent, or Firm* — GREENBERG TRAURIG LLP

(57) ABSTRACT

A method may include: receiving a first communication from an ATM; identifying a first processing server of a plurality of processing servers; associating the first processing server to the ATM and returning an association indicator for an association between the ATM and the first processing; routing the first communication to the first processing server; saving a session state of the ATM to a cache; determining that the first processing server is offline; identifying a second processing server; associating the second processing server to the ATM and returning a new association indicator for the association between the ATM and the second processing server to the ATM; receiving a second communication from the ATM to process a transaction comprising the new association indicator; identifying the second processing server from the new association indicator; routing second communication to the second processing server; and retrieving the session state for the ATM from the cache.

17 Claims, 3 Drawing Sheets

SYSTEMS AND METHODS FOR ATM SESSION CACHING

RELATED APPLICATIONS

This application claims the benefit of U.S. provisional patent application Ser. No. 63/489,276, filed Mar. 9, 2023, the disclosure of which is incorporated by reference herein in its entirety.

BACKGROUND

1. Field of the Disclosure

Embodiments of this disclosure generally relate to systems and methods for automated teller machine session caching.

2. Description of the Related Art

Automatic teller machines ("ATMs") often connect to an ATM backend platform for transaction processing. The ATM backend platform is divided into multiple groups of transaction processing servers, and each group is designated to handle a particular set of ATMs. Conventional ATM systems are designed in this manner to facilitate interaction with other connected systems for processing ATM transactions. In such a configuration, however, even a brief connection interruption or processing server outage (planned or unplanned) will result in the transaction halting and may result in a session state for the transaction being lost.

An ATM may be configured to transition its connection to a secondary processing server in the event of an interruption in service, but the transaction progress will be lost and will have to be reinitiated. Further, in complex, multipart transactions (e.g., depositing of multiple checks at the ATM) the transaction may not be recoverable, and manual intervention may be required. A move to cloud environments will only exacerbate interruptions in connections and/or processing services.

SUMMARY

Systems and methods for automated teller machine session caching are disclosed. In one embodiment, a method may include: (1) receiving, at a routing controller, a first communication from an automated teller machine (ATM); (2) identifying, by the routing controller, a first processing server of a plurality of processing servers; (3) associating, by the routing controller, the first processing server to the ATM and returning an association indicator for an association between the ATM and the first processing server to the ATM; (4) routing, by the routing controller, the first communication to the first processing server; (5) saving, by the first processing server, a session state of the ATM to a cache; (6) determining, by the routing controller, that the first processing server is offline; (7) identifying, by the routing controller, a second processing server of the plurality of processing servers; (8) associating, by the routing controller, the second processing server to the ATM and returning a new association indicator for the association between the ATM and the second processing server to the ATM; (9) receiving, at the routing controller, a second communication from the ATM to process a transaction comprising the new association indicator; (10) identifying, by the routing controller, the second processing server from the new association indicator; (11) routing, by the routing controller, the second communication to the second processing server; and (12) retrieving, by the second processing server, the session state for the ATM from the cache.

In one embodiment, the first communication and the second communication comprise HTTP requests.

In one embodiment, the first communication comprises a request to be associated with a one of the plurality of processing servers.

In one embodiment, the session state comprises in-flight transaction information.

In one embodiment, the cache comprises a distributed cache comprising a plurality of cache nodes, wherein the plurality of cache nodes are in communication with each other.

In one embodiment, the ATM is re-assigned to a different processing server of the plurality of processing servers periodically.

In one embodiment, the method may also include selecting, by a load balancer, the routing controller out of a plurality of routing controllers; and routing, by the load balancer, the first communication to the routing controller.

According to another embodiment, a system may include: an automated teller machine (ATM); a routing controller in communication with the ATM; a plurality of processing servers in communication with the routing controller; and a cache in communication with the plurality of routing controllers. The routing controller is configured to receive a first communication from the ATM, to identify a first processing server of the plurality of processing servers, to associate the first processing server to the ATM; to return an association indicator for an association between the ATM and the first processing server to the ATM, to route the first communication to the first processing server, to save a session state of the ATM to a cache, to determine that the first processing server is offline, to identify a second processing server of the plurality of processing servers, to associate the second processing server to the ATM, to return a new association indicator for the association between the ATM and the second processing server to the ATM, to receive a second communication from the ATM to process a transaction comprising the new association indicator, to identify the second processing server from the new association indicator, to route the second communication to the second processing server, and to retrieve the session state for the ATM from the cache.

In one embodiment, the first communication and the second communication comprise HTTP requests.

In one embodiment, the first communication comprises a request to be associated with a one of the plurality of processing servers.

In one embodiment, the session state comprises in-flight transaction information.

In one embodiment, the cache comprises a distributed cache comprising a plurality of cache nodes, wherein the plurality of cache nodes are in communication with each other.

In one embodiment, the ATM is re-assigned to a different processing server of the plurality of processing servers periodically.

In one embodiment, the system may also include a load balancer that is configured to select the routing controller out of a plurality of routing controllers, and to route the first communication to the routing controller.

According to another embodiment, a non-transitory computer readable storage medium may include instructions stored thereon, which when read and executed by one or more computer processors, cause the one or more computer processors to perform steps comprising: receiving a first communication from an automated teller machine (ATM); identifying a first processing server of a plurality of processing servers; associating the first processing server to the ATM and returning an association indicator for an association between the ATM and the first processing server to the ATM; routing the first communication to the first processing server; saving a session state of the ATM to a cache; determining that the first processing server is offline; identifying a second processing server of the plurality of processing servers; associating the second processing server to the ATM and returning a new association indicator for the association between the ATM and the second processing server to the ATM; receiving a second communication from the ATM to process a transaction comprising the new association indicator; identifying the second processing server from the new association indicator; routing second communication to the second processing server; and retrieving the session state for the ATM from the cache.

In one embodiment, the first communication and the second communication comprise HTTP requests.

In one embodiment, the first communication comprises a request to be associated with a one of the plurality of processing servers.

In one embodiment, the session state comprises in-flight transaction information.

In one embodiment, the cache comprises a distributed cache comprising a plurality of cache nodes, wherein the plurality of cache nodes are in communication with each other.

In one embodiment, the ATM is re-assigned to a different processing server of the plurality of processing servers periodically.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION

Figure 1:
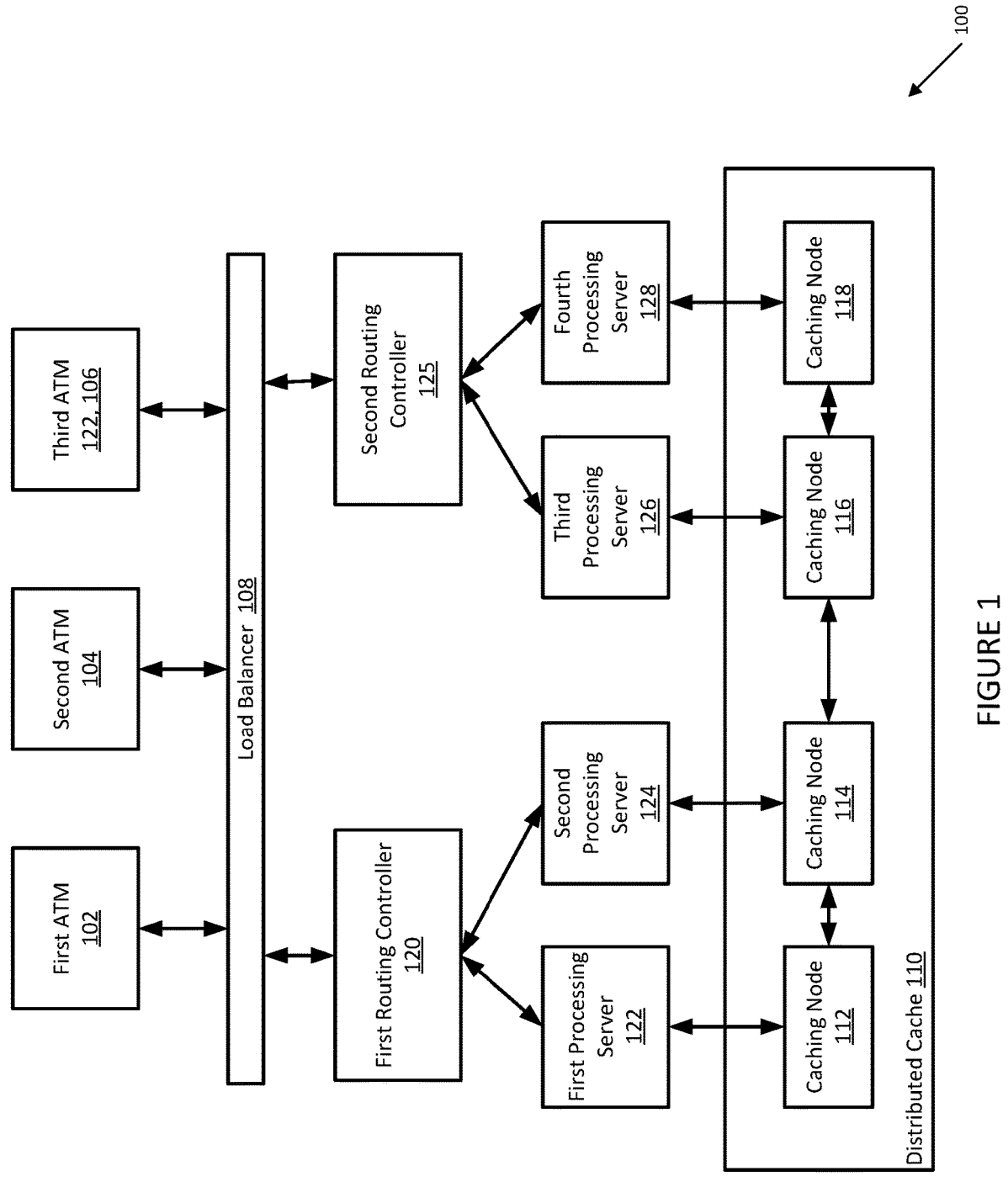
FIG. 1 illustrates a system for providing ATM session caching according to an embodiment.

Embodiments generally relate to systems and methods for automated teller machine (ATM) session caching.

An organization's ATMs generally connect to a backend technology infrastructure that may include a processing system to process transactions conducted at the ATM. An organization's backend processing system may only processes transactions from known ATMs. An organization's backend processing system may include servers that accept connections from known ATMs, and may establish a session with a connected ATM.

A server session with a connected ATM is considered a "sticky" session because the session will end with the server at which it started. If there is a network connection outage between the ATM and a server with which the ATM has established a session, or if the server/services become unavailable for some other reason, the transaction at the ATM will not be processed, and an end user will experience a service outage. Conventional ATM systems cannot transfer transaction processing to a different processing server on the processing system backend. ATMs may attempt to connect to secondary servers, but a previous session will not be reestablished with the secondary server because the originally established session's context, state, etc., is stored locally on the processing server, and is lost in the event of a connection or service outage.

Additionally, where a group of ATM backend processing servers will undergo a planned outage, all ATMs configured to connect to the servers in the processing group that will undergo the planned outage must be reconfigured to connect to, and establish sessions with, different backend servers.

In some embodiments, a cache, such as a distributed cache system, may be configured to establish and maintain a session for managing transaction session state information. A distributed cache system may be independent of backend processing servers that process ATM transactions such that, in case of a server outage, an ATM transaction session may be directed to another, secondary server, and the transaction may continue being processed by the secondary server.

Advantages to embodiments described herein may include: an improved customer experience; less frequent ATM outages and higher ATM availability; fewer customer support calls due to outages; operator cost savings in the area of customer support; the ability to facilitate rolling deployments without migrating ATMs to other systems; and a reduction in maintenance and troubleshooting hours invested.

In some embodiments, a distributed cache system may receive a connection request from an ATM and may accept the connection and establish a session with the requesting ATM. The requesting ATM may provide session details, context, and state information to the distributed cache system, and the distributed cache system may establish a session including the provided session details. The session may be stored in a distributed manner, such that it is highly available to servers in an ATM backend processing platform.

After establishing a session with an ATM, a distributed cache system may establish a connection with a processing server in an ATM backend processing platform. The distributed cache system may provide the session details stored in the distributed cache to the processing server, and the processing server may proceed with processing the transaction based on the details provided to the server by the distributed cache system. As the state of a transaction changes due to processing by the server, the server may update the transaction details on the distributed cache. That is, the server may synchronize (e.g., in real-time, near real-time, in batches, etc.) the session details on the distributed cache with the session details in its local memory as the transaction processing proceeds. In this way, the distributed cache system may maintain the state of the transaction.

In the event that the processing server becomes unavailable, the distributed caching system may have a copy of the session from the processing server that is current as of the last successful transaction step performed by the processing server. Accordingly, a secondary server may use the copy of the session on the distributed cache system to resume processing at the point where the primary server suffered the outage.

An ATM may maintain a conventional connection request and sticky session configuration. The request and session, however, may be directed to and established with, the distributed cache system. The distributed cache system may be configured to receive the connection request and the session information in the same manner as a conventional ATM backend processing platform (e.g., using the same protocols, format, etc.). Likewise, the distributed cache system may be configured to provide a connection request and session information to a processing server in the conventional manner (i.e., using the same protocols, data formats, etc.). In this way, neither the ATMs nor the backend processing servers need to be reconfigured. The distributed cache system may be a transparent layer/system to the ATMs and the backend processing servers and may be configured to operate between the ATMs and corresponding backend processing servers as a session brokerage system.

Session information may include information such as a session identifier, a transaction identifier, and may also include transaction details, such as an encrypted personal identification number (PIN), a transaction amount, an indication parameter that indicates whether the transaction is a deposit or a withdraw, an account identifier (e.g., an account number) that identifies an account against which the transaction will debit the transaction amount, etc.

During the session, all personal information or personal identifiable information may be encrypted.

FIG. 1 illustrates a system for providing ATM session caching according to an embodiment. System 100 may include a plurality of ATMs, such as first ATM 102, second ATM 104, and third ATM 106. It should be recognized that a greater or a fewer number of ATMs may be provided as is necessary and/or desired.

ATMs 102, 104, 106 may be any suitable ATM, such as those commonly provisioned by financial institutions at branch locations, or at locations such as convenience stores, gas stations, etc. ATMs 102, 104, 106 may be configured as Hypertext Transfer Protocol Secure (HTTPs) clients. In response to an interaction with a user, ATM 102, 104, 106 may generate an HTTP request, e.g., using an HTTP post method, to establish a session with one of processing servers (e.g., first processing server 122, second processing server 124, third processing server 126, fourth processing server 128). It is to be understood that other transfer protocols may also be used in addition to or in lieu of HTTPs.

ATMs 102, 104, 106 may interface with load balancer 108, which may then interface with one or more routing controllers (e.g., first routing controller 120 and second routing controller 125). It should also be noted that a greater number of routing controllers may be provided as is necessary and/or desired.

First routing controller 120 and second routing controller 125 may route a session from ATMs 102, 104, 106 to one of the processing servers (e.g., first processing server 122, second processing server 124, third processing server 126, fourth processing server 128). It should be noted that a greater or a fewer number of processing servers may be provided as is necessary and/or desired.

One of routing controllers 120 and 125 may receive a request from one of ATMs 102, 104, 106 for a processing server, the routing controller may validate and authenticate the requesting ATM. Routing controller 120 or 125 may assign the requesting ATM to one of processing servers 122, 124, 126, 128, and may maintain an association indicator for a certain period of time. During the period of time, requests from the requesting ATM will be send to the assigned processing server.

The period of time may be configurable, such as by the organization implementing ATMs 102, 104, 106. Alternatively, the period of time may be predetermined.

ATMs 102, 104, 106 may only be associated with a single processing server 122, 124, 126, 128 at a time, but each processing server 122, 124, 126, 128 may be associated with more than one ATM 102, 104, 106 at a time.

System 100 may further include a cache, such as distributed cache 110. Distributed cache 110 may include one or more caching nodes, such as caching node 112, caching node 114, caching node 116, and caching node 118. It should be recognized that a greater or a fewer number of caching nodes may be provided as is necessary and/or desired.

Caching nodes 112, 114, 116, 118 may interface with each other, so that each caching node may access data store on the other caching nodes.

In one embodiment, caching nodes 112, 114, 116, 118 may store the session state of one or more ATMs 102, 104, 106. For example, caching nodes 112, 114, 116, 118 may store an identifier for the ATM and the processing server to which it is assigned as well as information regarding any in-flight transaction (e.g., a customer identifier, a transaction identifier, a transaction state, etc.).

Caching nodes 112, 114, 116, 118 may cache the received session data in any suitable manner. For instance, caching nodes 112, 114, 116, 118 may instantiate an object of a singleton software class in cache memory and write the received session data to fields or attributes of the instantiated object. One of the processing servers 122, 124, 126, 128 may update the fields or attributes of the object with transaction updates as a transaction procedure is executed. A singleton class may be used in order to prevent multiple objects of the relevant software class from being instantiated. This is notable because so long as the session between one of the ATMs and a processing server is alive, the session object should remain in cache memory and data from the ATM and/or any processing server that is handling processing requests for the session should write to and/or update the same in-memory object. A singleton session class is exemplary, and any suitable method of maintaining session data in the cache memory of caching node may be used. For instance, in some embodiments, global variables of a software class may be used to maintain session information throughout a session.

If, during the transaction processing procedure, the assigned processing server (e.g., first processing server 122) becomes unavailable for some reason (e.g., connectivity issues, server hardware issues, etc.), the cached session information stored in the caching node may be provided to a second processing server (e.g., second processing server 124). For example, the second processing server may receive the cached session state information and an indication of the last successfully completed transaction step. The new processing server will then continue the transaction processing procedure using the cached session state information at the processing step after the last processing step that was successfully completed by the inactive processing server.

Figure 2:
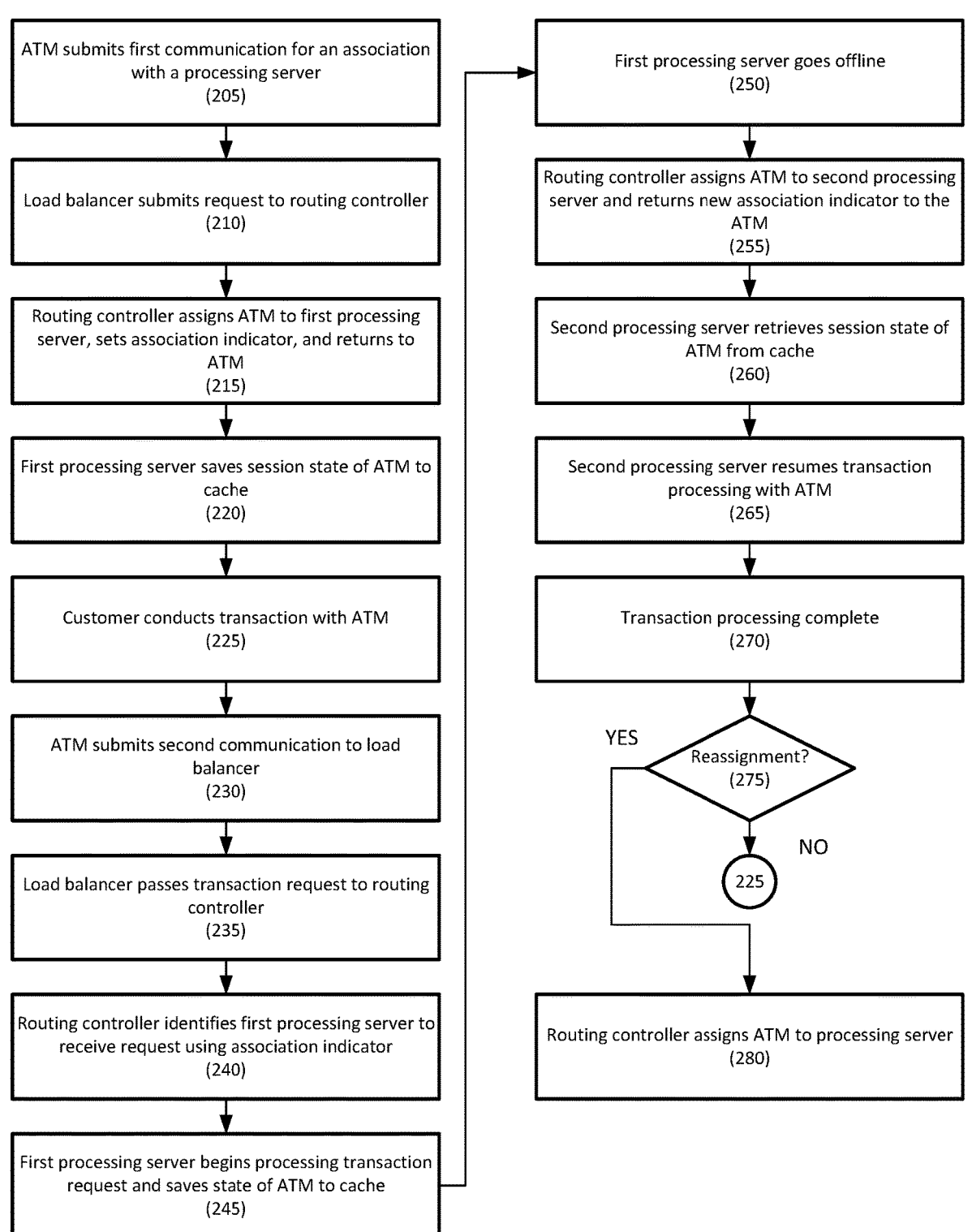
FIG. 2 illustrates a logical flow for ATM session caching according to an embodiment.

FIG. 2 illustrates a logical flow for ATM session caching, according to an embodiment.

In step 205, an ATM may submit a first communication, such as a request to be associated with a one of a plurality of processing servers. In one embodiment, the request may be made after the expiration of a predetermined period of time, in response to a planned outage, etc.

In one embodiment, the request may be submitted to a load balancer.

In step 210, the load balancer may submit the request to one of a plurality of routing controllers. The load balancer may select the routing controller using any suitable mechanism, algorithm, etc. as is necessary and/or desired.

In step 215, the selected routing controller may receive the request and may assign the requesting ATM to a first processing server of a plurality of processing servers. The routing controller may then set an association indicator that indicates the association between the requesting ATM and the first processing server, and may return the association indicator to the requesting ATM.

In one embodiment, the association indicator may expire after a certain number of uses, after the passage of a certain amount of time, etc. Upon expiration, the ATM may be reassigned to a different routing controller, or to the same routing controller.

In step 220, the first processing server may save a session state of the ATM to a cache, such as a distributed cache. The distributed cache may include a plurality of interconnected nodes, and the session state may be saved to one of the nodes.

In step 225, a customer may conduct a transaction with the ATM. For example, the transaction may be multi-step transactions, such as a withdrawal, deposit, etc.

In step 230, the ATM may submit a second communication, such as a transaction request, to the load balancer. In one embodiment, the ATM may submit a HTTP request for the transaction. In one embodiment, the HTTP request may include the association indicator.

In step 235, the load balancer may pass the transaction request to the routing controller, which, in step 240, may identify the processing server associated with the ATM using the association indicator.

If the request does not include an association indicator, the routing controller may select a processing server and may generate a new association indicator.

In step 245, the processing server associated with the ATM, such as the first processing server, may begin processing the transaction request and may save the session state of the ATM to the cache.

In step 250, the first processing server may go offline as part of a planned or unplanned outage. In one embodiment, the routing controller may be in communication with the processing servers and may detect when one of the processing servers goes offline.

In step 255, in response to the first processing server going offline, the routing controller may identify a second processing server to complete the transaction, and may assign the ATM to the second processing server. It may further generate a new association indicator for the association, and may return the new association indicator to the ATM.

In step 260, the second processing server may retrieve the session state of the ATM from the cache. For example, for each incoming request, the processing server may retrieve the session state for the ATM from the cache.

In step 265, the second processing server may resume the transaction processing with the ATM until, in step 270, the transaction processing is complete.

In step 275, after a period of time and/or upon the occurrence of an event, reassignment of the ATM may be desired. If so, in step 280, the routing controller may assign the ATM to a processing server, which may be the same processing server that was previously used, or it may be a different one. The assignment may be random, may be based on a rotation, etc.

If reassignment is not appropriate, the process may return to step 225.

Figure 3:
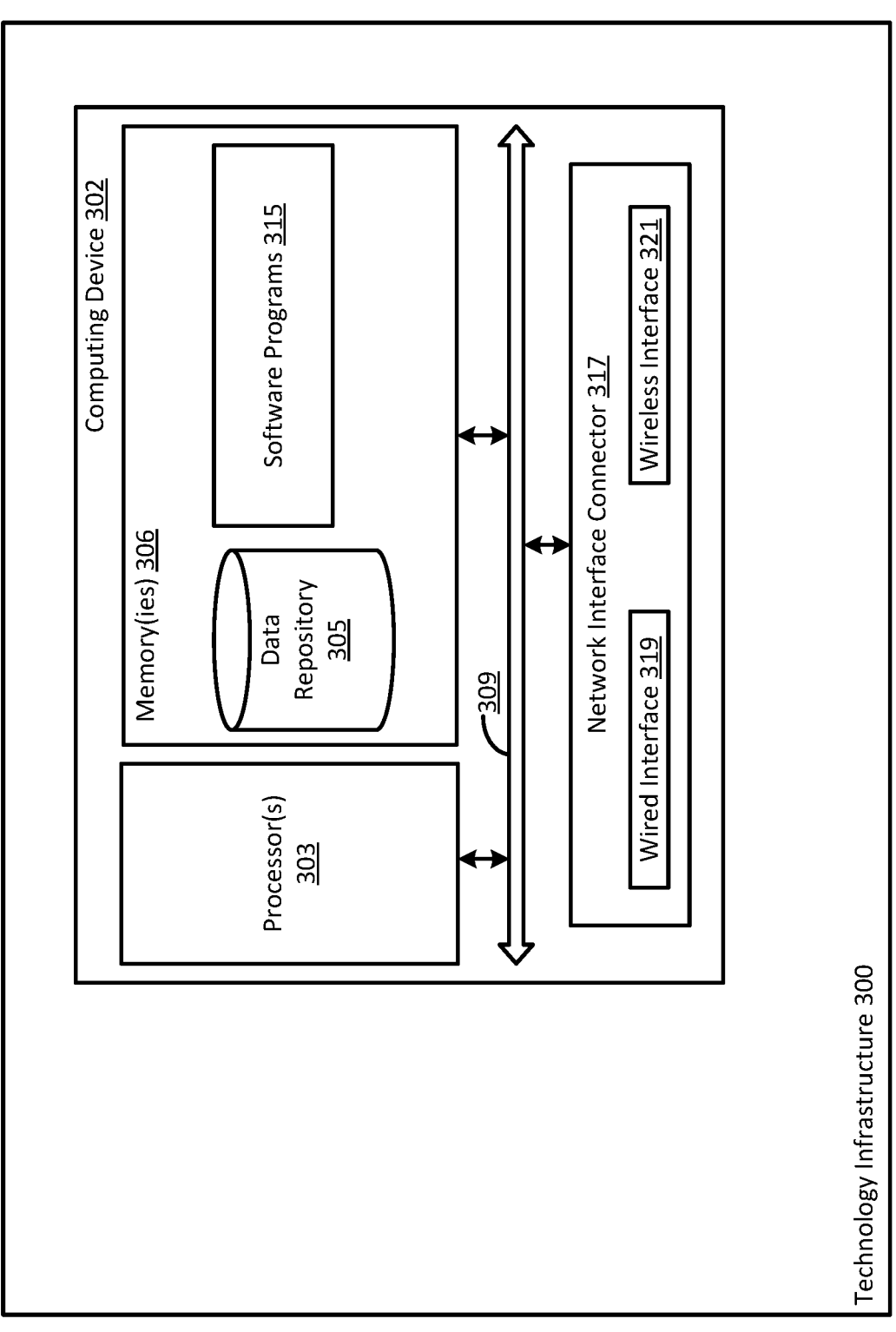
FIG. 3 illustrates a block diagram of a technology infrastructure and computing device for implementing certain embodiments of the present disclosure.

FIG. 3 illustrates a block diagram of a technology infrastructure and computing device for implementing certain aspects of the present disclosure. Technology infrastructure

300 may represent the technology infrastructure of an implementing organization. Technology infrastructure 300 may include hardware such as servers, client devices, and other computers or processing devices. Technology infrastructure 300 may include software (e.g., computer) applications that execute on computers and other processing devices. Technology infrastructure 300 may include computer network mediums, and computer networking hardware and software for providing operative communication between computers, processing devices, software applications, procedures and processes, and logical flows and steps, as described herein.

Exemplary hardware and software that may be implemented in combination where software (such as a computer application) executes on hardware. For instance, technology infrastructure 300 may include webservers, application servers, database servers and database engines, communication servers such as email servers and SMS servers, client devices, etc. The term "service" as used herein may include software that, when executed, receives client service requests and responds to client service requests with data and/or processing procedures. A software service may be a commercially available computer application or may be a custom-developed and/or proprietary computer application. A service may execute on a server. The term "server" may include hardware (e.g., a computer including a processor and a memory) that is configured to execute service software. A server may include an operating system optimized for executing services. A service may be a part of, included with, or tightly integrated with a server operating system. A server may include a network interface connection for interfacing with a computer network to facilitate operative communication between client devices and client software, and/or other servers and services that execute thereon.

Server hardware may be virtually allocated to a server operating system and/or service software through virtualization environments, such that the server operating system or service software shares hardware resources such as one or more processors, memories, system buses, network interfaces, or other physical hardware resources. A server operating system and/or service software may execute in virtualized hardware environments, such as virtualized operating system environments, application containers, or any other suitable method for hardware environment virtualization.

Technology infrastructure 300 may also include client devices. A client device may be a computer or other processing device including a processor and a memory that stores client computer software and is configured to execute client software. Client software is software configured for execution on a client device. Client software may be configured as a client of a service. For example, client software may make requests to one or more services for data and/or processing of data. Client software may receive data from, e.g., a service, and may execute additional processing, computations, or logical steps with the received data. Client software may be configured with a graphical user interface such that a user of a client device may interact with client computer software that executes thereon. An interface of client software may facilitate user interaction, such as data entry, data manipulation, etc., for a user of a client device.

A client device may be a mobile device, such as a smart phone, tablet computer, or laptop computer. A client device may also be a desktop computer, or any electronic device that is capable of storing and executing a computer application (e.g., a mobile application). A client device may include a network interface connector for interfacing with a public or private network and for operative communication with other devices, computers, servers, etc., on a public or private network.

Technology infrastructure 300 includes network routers, switches, and firewalls, which may comprise hardware, software, and/or firmware that facilitates transmission of data across a network medium. Routers, switches, and firewalls may include physical ports for accepting physical network medium (generally, a type of cable or wire—e.g., copper or fiber optic wire/cable) that forms a physical computer network. Routers, switches, and firewalls may also have "wireless" interfaces that facilitate data transmissions via radio waves. A computer network included in technology infrastructure 300 may include both wired and wireless components and interfaces and may interface with servers and other hardware via either wired or wireless communications. A computer network of technology infrastructure 300 may be a private network but may interface with a public network (such as the internet) to facilitate operative communication between computers executing on technology infrastructure 300 and computers executing outside of technology infrastructure 300.

FIG. 3 further depicts exemplary computing device 302. Computing device 302 depicts exemplary hardware that executes the logic that drives the various system components described herein. Servers and client devices may take the form of computing device 302. While shown as internal to technology infrastructure 300, computing device 302 may be external to technology infrastructure 300 and may be in operative communication with a computing device internal to technology infrastructure 300.

System components such as an ATM, a distributed cache, a caching node, a processing server, client devices, servers, various database engines and database services, and other computer applications and logic may include, and/or execute on, components and configurations the same, or similar to, computing device 302.

Computing device 302 may include a processor 303 coupled to a memory 306. Memory 306 may include volatile memory and/or persistent memory. The processor 303 executes computer-executable program code stored in memory 306, such as software programs 315. Software programs 315 may include one or more of the logical steps disclosed herein as a programmatic instruction, which can be executed by processor 303. Memory 306 may also include data repository 305, which may be nonvolatile memory for data persistence. The processor 303 and the memory 306 may be coupled by a bus 309. In some examples, the bus 309 may also be coupled to one or more network interface connectors 317, such as wired network interface 319, and/or wireless network interface 321. Computing device 302 may also have user interface components, such as a screen for displaying graphical user interfaces and receiving input from the user, a mouse, a keyboard and/or other input/output components (not shown).

Services, modules, engines, etc., described herein may provide one or more application programming interfaces (APIs) in order to facilitate communication with related/provided computer applications and/or among various public or partner technology infrastructures, data centers, or the like. APIs may publish various methods and expose the methods, e.g., via API gateways. A published API method may be called by an application that is authorized to access the published API method. API methods may take data as one or more parameters or arguments of the called method. In some aspects, API access may be governed by an API gateway associated with a corresponding API. In some aspects, incoming API method calls may be routed to an API gateway and the API gateway may forward the method calls to internal services/modules/engines that publish the API and its associated methods.

A service/module/engine that publishes an API may execute a called API method, perform processing on any data received as parameters of the called method, and send a return communication to the method caller (e.g., via an API gateway). A return communication may also include data based on the called method, the method's data parameters and any performed processing associated with the called method.

API gateways may be public or private gateways. A public API gateway may accept method calls from any source without first authenticating or validating the calling source. A private API gateway may require a source to authenticate or validate itself via an authentication or validation service before access to published API methods is granted. APIs may be exposed via dedicated and private communication channels such as private computer networks or may be exposed via public communication channels such as a public computer network (e.g., the internet). APIs, as discussed herein, may be based on any suitable API architecture. Exemplary API architectures and/or protocols include SOAP (Simple Object Access Protocol), XML-RPC, REST (Representational State Transfer), or the like.

The various processing steps, logical steps, and/or data flows depicted in the figures and described in greater detail herein may be accomplished using some or all of the system components also described herein. In some implementations, the described logical steps or flows may be performed in different sequences and various steps may be omitted. Additional steps may be performed along with some, or all of the steps shown in the depicted logical flow diagrams. Some steps may be performed simultaneously. Some steps may be performed using different system components. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a processor and/or in the form of statically or dynamically programmed electronic circuitry.

The system of the invention or portions of the system of the invention may be in the form of a "processing device," a "computing device," a "computer," an "electronic device," a "mobile device," a "client device," a "server," etc. As used herein, these terms (unless otherwise specified) are to be understood to include at least one processor that uses at least one memory. The at least one memory may store a set of instructions. The instructions may be either permanently or temporarily stored in the memory or memories of the processing device. The processor executes the instructions that are stored in the memory or memories in order to process data. A set of instructions may include various instructions that perform a particular step, steps, task, or tasks, such as those steps/tasks described above, including any logical steps or logical flows described above. Such a set of instructions for performing a particular task may be characterized herein as an application, computer application, program, software program, service, or simply as "software." In one aspect, a processing device may be or include a specialized processor. As used herein (unless otherwise indicated), the terms "module," and "engine" refer to a computer application that executes on hardware such as a server, a client device, etc. A module or engine may be a service.

As noted above, the processing device executes the instructions that are stored in the memory or memories to process data. This processing of data may be in response to commands by a user or users of the processing device, in response to previous processing, in response to a request by another processing device and/or any other input, for example. The processing device used to implement the invention may utilize a suitable operating system, and instructions may come directly or indirectly from the operating system.

The processing device used to implement the invention may be a general-purpose computer. However, the processing device described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing device be physically located in the same geographical place. That is, each of the processors and the memories used by the processing device may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing device what to do with the data being processed.

Further, it is appreciated that the instructions or set of instructions used in the implementation and operation of the invention may be in a suitable form such that the processing device may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing device, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing device, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing device, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by a processor.

Further, the memory or memories used in the processing device that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing device or machines that are used to implement the invention. As used herein, a user interface includes any hardware, software, or combination of hardware and software used by the processing device that allows a user to interact with the processing device. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing device as it processes a set of instructions and/or provides the processing device with information. Accordingly, the user interface is any device that provides communication between a user and a processing device. The information provided by the user to the processing device through the user interface may be in the form of a command, a selection of data, or some other input, for example.

As discussed above, a user interface is utilized by the processing device that performs a set of instructions such that the processing device processes data for a user. The user interface is typically used by the processing device for interacting with a user either to convey information or receive information from the user. However, it should be appreciated that in accordance with some aspects of the system and method of the invention, it is not necessary that a human user actually interact with a user interface used by the processing device of the invention. Rather, it is also contemplated that the user interface of the invention might interact, i.e., convey and receive information, with another processing device, rather than a human user. Accordingly, the other processing device might be characterized as a user. Further, it is contemplated that a user interface utilized in the system and method of the invention may interact partially with another processing device or processing devices, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

What is claimed is:

1. A method, comprising:
receiving, at a routing controller, a first communication from an automated teller machine (ATM);

identifying, by the routing controller, a first processing server of a plurality of processing servers associated with the routing controller;

associating, by the routing controller, the first processing server to the ATM and returning an association indicator for an association between the ATM and the first processing server to the ATM;

routing, by the routing controller, the first communication to the first processing server;

saving, by the first processing server, a session state of the ATM to a distributed cache, wherein the distributed cache comprises a plurality of caching nodes, each caching node in communication with one of the plurality of processing servers;

determining, by the routing controller, that the first processing server is offline;

identifying, by the routing controller, a second processing server of the plurality of processing servers associated with the routing controller;

associating, by the routing controller, the second processing server to the ATM and returning a new association indicator for the association between the ATM and the second processing server to the ATM;

receiving, at the routing controller, a second communication from the ATM to process a transaction and the new association indicator;

identifying, by the routing controller, the second processing server from the new association indicator;

routing, by the routing controller, the second communication to the second processing server; and retrieving, by the second processing server, the session state for the ATM from the caching node of the distributed cache that is in communication with the second processing server.

2. The method of claim 1, wherein the first communication and the second communication comprise HTTP requests.

3. The method of claim 1, wherein the first communication comprises a request to be associated with a one of the plurality of processing servers.

4. The method of claim 1, wherein the session state comprises in-flight transaction information.

5. The method of claim 1, wherein the ATM is re-assigned to a different processing server of the plurality of processing servers periodically.

6. The method of claim 1, further comprising:
selecting, by a load balancer, the routing controller out of a plurality of routing controllers; and
routing, by the load balancer, the first communication to the routing controller.

7. A system, comprising:
an automated teller machine (ATM);
a routing controller in communication with the ATM;
a plurality of processing servers in communication with the routing controller; and
a distributed cache comprising a plurality of caching nodes, each caching node in communication with one of the plurality of processing servers;
wherein:
the routing controller is configured to receive a first communication from the ATM, to identify a first processing server of the plurality of processing servers associated with the routing controller, to associate the first processing server to the ATM; to return an association indicator for an association between the ATM and the first processing server to the ATM, to route the first communication to the first processing server, to save a session state of the ATM to the distributed cache, to determine that the first processing server is offline, to identify a second processing server of the plurality of processing servers associated with the routing controller, to associate the second processing server to the ATM, to return a new association indicator for the association between the ATM and the second processing server to the ATM, to receive a second communication from the ATM to process a transaction and the new association indicator, to identify the second processing server from the new association indicator, to route the second communication to the second processing server, and to retrieve the session state for the ATM from the caching node of the distributed cache that is in communication with the second processing server.

8. The system of claim 7, wherein the first communication and the second communication comprise HTTP requests.

9. The system of claim 7, wherein the first communication comprises a request to be associated with a one of the plurality of processing servers.

10. The system of claim 7, wherein the session state comprises in-flight transaction information.

11. The system of claim 7, wherein the ATM is re-assigned to a different processing server of the plurality of processing servers periodically.

12. The system of claim 7, further comprising a load balancer that is configured to select the routing controller out of a plurality of routing controllers, and to route the first communication to the routing controller.

13. A non-transitory computer readable storage medium, including instructions stored thereon, which when read and executed by one or more computer processors, cause the one or more computer processors to perform steps comprising:
  receiving a first communication from an automated teller machine (ATM);
  identifying a first processing server of a plurality of processing servers associated with a routing controller;
  associating the first processing server to the ATM and returning an association indicator for an association between the ATM and the first processing server to the ATM;

16 routing the first communication to the first processing server;
  saving a session state of the ATM to a distributed cache, wherein the distributed cache comprises a plurality of caching nodes, each caching node in communication with one of the plurality of processing servers;
  determining that the first processing server is offline;
  identifying a second processing server of the plurality of processing servers associated with the routing controller;
  associating the second processing server to the ATM and returning a new association indicator for the association between the ATM and the second processing server to the ATM;
  receiving a second communication from the ATM to process a transaction and the new association indicator;
  identifying the second processing server from the new association indicator;
  routing second communication to the second processing server; and
  retrieving the session state for the ATM from the caching node of the distributed cache that is in communication with the second processing server.

14. The non-transitory computer readable storage medium of claim 13, wherein the first communication and the second communication comprise HTTP requests.

15. The non-transitory computer readable storage medium of claim 13, wherein the first communication comprises a request to be associated with a one of the plurality of processing servers.

16. The non-transitory computer readable storage medium of claim 13, wherein the session state comprises in-flight transaction information.

17. The non-transitory computer readable storage medium of claim 13, wherein the ATM is re-assigned to a different processing server of the plurality of processing servers periodically.

* * * * *